(12) United States Patent
Rudge et al.

(10) Patent No.: US 10,091,561 B1
(45) Date of Patent: Oct. 2, 2018

(54) WATERMARKS IN DISTRIBUTED CONSTRUCTION OF VIDEO ON DEMAND (VOD) FILES

(71) Applicant: Harmonic, Inc., San Jose, CA (US)

(72) Inventors: Gil Rudge, Brookline, MA (US); William Moore Macauley, Sunnyvale, CA (US); Thomas Francis Lattie, San Jose, CA (US)

(73) Assignee: Harmonic, Inc., San Jose, CA (US)

(*) Notice: Subject to any disclaimer, the term of this patent is extended or adjusted under 35 U.S.C. 154(b) by 11 days.

(21) Appl. No.: 15/062,094

(22) Filed: Mar. 5, 2016

Related U.S. Application Data

(60) Provisional application No. 62/128,768, filed on Mar. 5, 2015.

(51) Int. Cl.
| | |
|---|---|
| *H04N 21/8358* | (2011.01) |
| *H04N 21/233* | (2011.01) |
| *H04N 21/235* | (2011.01) |
| *H04N 21/237* | (2011.01) |
| *H04N 21/4627* | (2011.01) |
| *H04N 21/81* | (2011.01) |
| *H04N 21/2343* | (2011.01) |
| *H04N 21/254* | (2011.01) |

(52) U.S. Cl.
CPC ....... *H04N 21/8358* (2013.01); *H04N 21/233* (2013.01); *H04N 21/235* (2013.01); *H04N 21/237* (2013.01); *H04N 21/23439* (2013.01); *H04N 21/2541* (2013.01); *H04N 21/4627* (2013.01); *H04N 21/8106* (2013.01)

(58) Field of Classification Search
CPC .................................................... H04N 21/812
See application file for complete search history.

(56) References Cited

U.S. PATENT DOCUMENTS

| | | | | |
|---|---|---|---|---|
| 2002/0013943 | A1* | 1/2002 | Haberman | G11B 27/031 725/39 |
| 2009/0172763 | A1* | 7/2009 | Liu | H04L 29/06027 725/114 |
| 2012/0134238 | A1* | 5/2012 | Surprenant | H04S 1/007 367/137 |
| 2015/0040175 | A1* | 2/2015 | Ramaswamy | G06Q 30/0201 725/116 |

* cited by examiner

*Primary Examiner* — Nasser Goodarzi
*Assistant Examiner* — Adil Ocak
(74) *Attorney, Agent, or Firm* — Brokaw Patent Law PC; Christopher J Brokaw

(57) ABSTRACT

Approaches for creating video on demand (VOD) assets with a VOD watermark. For a digital stream yet to be broadcast, a duplicate version of an accompanying audio stream comprised within the digital stream is created. A video on demand (VOD) watermark is inserted into or affixed within the duplicate version of the accompanying audio stream. Thereafter, the digital broadcast stream which comprises the original audio stream and the duplicate version is transmitted to an integrated receiver-decoder. The integrated receiver-decoder creates a broadcast version of the digital broadcast stream which comprises a broadcast watermark and a video on demand (VOD) version of the digital broadcast stream which comprises a VOD watermark. The integrated receiver-decoder may align the broadcast video with the VOD watermarked audio to ensure proper local storage and subsequent VOD distribution.

15 Claims, 4 Drawing Sheets

| Segmentation Message | Segmentation_type_id | segment_num | segments_expected |
|---|---|---|---|
| Not Indicated | 0x00 | 0 | 0 |
| Content Identification | 0x01 | 0 | 0 |
| Program Start | 0x10 | 1 | 1 |
| Program End | 0x11 | 1 | 1 |
| Program Overlap Start | 0x17 | 1 | 1 |
| Program Blackout Override | 0x18 | 0 | 0 |
| Chapter Start | 0x20 | Non-zero | Non-zero |
| Chapter End | 0x21 | Non-zero | Non-zero |
| Placement Opportunity Start | 0x34 | 0 or Non-zero | 0 or Non-zero |
| Placement Opportunity End | 0x35 | 0 or Non-zero | 0 or Non-zero |
| Network Start | 0x50 | 0 | 0 |
| Network End | 0x51 | 0 | 0 |

WATERMARKS IN DISTRIBUTED CONSTRUCTION OF VIDEO ON DEMAND (VOD) FILES

CLAIM OF PRIORITY

This application claims priority to U.S. provisional patent application no. 62/128,768, filed Mar. 5, 2015, entitled "Watermarks in Distributed Construction of Video on Demand (VOD) Files," the contents of which are hereby incorporated by reference for all purposes as if fully set forth herein.

FIELD OF THE INVENTION

Embodiments of the invention relate to creating a video on demand (VOD) watermark.

BACKGROUND

There has been a rapid growth in the consumption of video on demand (VOD) by households in the United States. This growth has largely been driven by the increased availability of content, especially from broadcast type linear channel offerings from content distributors such as NBC and MTV. Indeed, it has become important enough that Nielsen's audience measurement system, at the behest of broadcast clients, has been adjusted to help capture this viewing as part of an extended broadcast window. In some cases, the broadcast window is extended 3 days beyond the original date of airing (known as "C3"), and in other case, the broadcast window has a 7 day extension (known as "C7") after the original date of airing.

Though there has been rapid growth in the consumption of VOD files, the processes and mechanisms supporting the creation and distribution of VOD files have not evolved as rapidly. The present day architecture is designed to accommodate the distribution of handfuls of movies to multichannel video programming distributor's (MVPD's) VOD servers, which are responsible for serving VOD content to requesting parties. Further, to allow for time to manage the distribution of VOD files, the VOD files need to be made available to the MVPD's VOD servers well in advance of their air dates. However, the number of movies and their lack of availability prior to their rollout to VOD servers have proven to be problematic for present day VOD architectures.

One prior art approach to address this issue (termed "Start Over" and developed by Time Warner Cable) involves recording broadcast streams locally as they are received and having them almost instantly available on VOD. This approach advantageously avoids (1) a centralized file making process and (2) a subsequent file distribution process. This approach of making the VOD file locally from the broadcast stream helps to overcome the traditional lag in the availability of VOD files after broadcast (losing some of the viewing window for C3/C7 and losing some of the freshness advantage of promotional material run to drive the original broadcast time) and may be done at potentially lower cost because the material does not have to be sent twice to the affiliate (once for broadcast and separately for VOD).

However, as the broadcast audience measurement window has been extended to C3/C7, it has often required a segmented marking for VOD consumption in order to differentiate it from digital video recorder (DVR) or network digital video recorder (nDVR) use cases, which are direct records of the broadcast material and which are segmented by capture of its later time of playback. In order to segment VOD viewing, VOD versioned files may be made or marked centrally, which undesirably delays the distribution of such material to MVPD's VOD servers. Alternately, to segment VOD viewing, VOD versioned files may be made locally by some of the largest MVPDs who can justify the added processing power needed locally to manage watermarking VOD files with a Nielsen watermark.

BRIEF DESCRIPTION OF THE DRAWINGS

Embodiments of the invention are illustrated by way of example, and not by way of limitation, in the figures of the accompanying drawings and in which like reference numerals refer to similar elements and in which:

FIG. 3 is a table illustrating segmentation information according to an embodiment of the invention.

DETAILED DESCRIPTION OF THE INVENTION

Approaches for the efficient creation of a video on demand (VOD) watermark are presented herein. In the following description, numerous specific details are set forth in order to provide a thorough understanding of the embodiments of the invention described herein. It will be apparent, however, that the embodiments of the invention described herein may be practiced without these specific details. In other instances, well-known structures and devices are shown in block diagram form or discussed at a high level in order to avoid unnecessarily obscuring teachings of embodiments of the invention.

EFFICIENT CREATION OF A VIDEO ON DEMAND (VOD) WATERMARK

Embodiments of the invention enable a watermark to be efficiently created and incorporated into a local video on demand (VOD) file assembly. Embodiments may create and incorporate the watermark into the local VOD file assembly in real time or near real time to broadcast of the video without requiring the additional burden of locally maintaining the added processing power to perform the process of applying or affixing a VOD watermarking.

Figure 1:
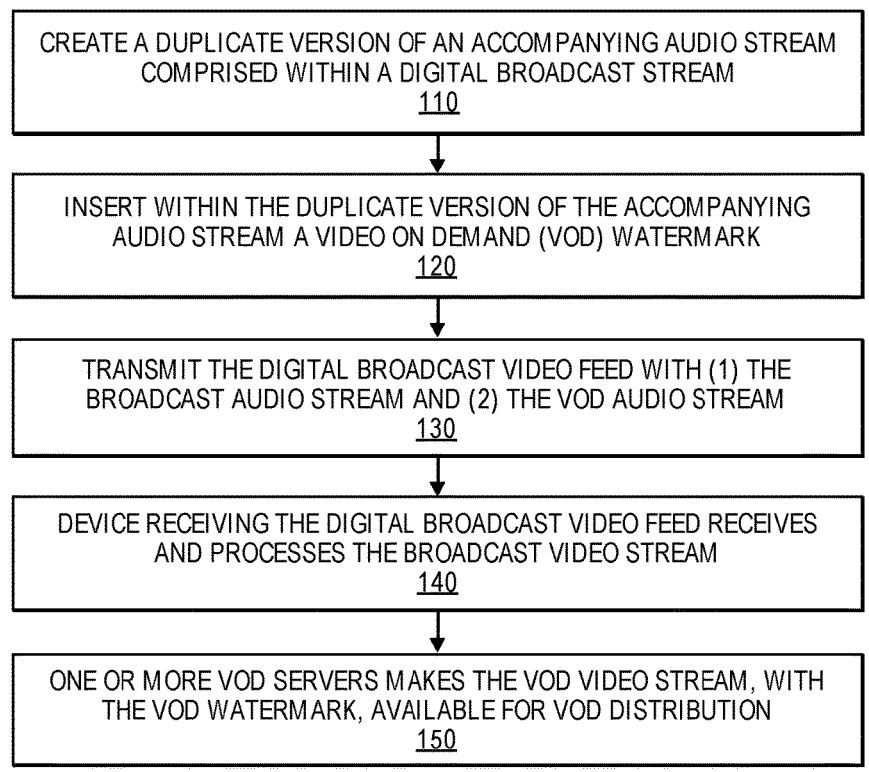
FIG. 1 is a flowchart illustrating the steps of creating and using a video on demand (VOD) watermark according to an embodiment of the invention.

FIG. 1 is a flowchart illustrating the steps of creating and using a video on demand (VOD) watermark according to an embodiment of the invention. The steps of FIG. 1 will be described with reference to FIG. 2, which is a block diagram of a system 200 for creating and distributing a broadcast feed comprising a video on demand (VOD) watermark according to an embodiment of the invention.

In step 110, a duplicate version of an accompanying audio stream comprised within a digital video stream to be broadcast is created. The creation of such a duplicate version of the accompanying audio stream may be made using a ChannelPort™ integrated channel playout device, available from Harmonic, Inc. of San Jose, Calif., to create two simultaneous but different audio streams. Embodiments of the invention may employ any approach for creating such multi-versioning of audio, as will be appreciated by those skilled in the art of playout control and watermarking. Note that the duplicate version of an accompanying audio stream may be identified by a different audio PID than the original audio stream.

Figure 2:
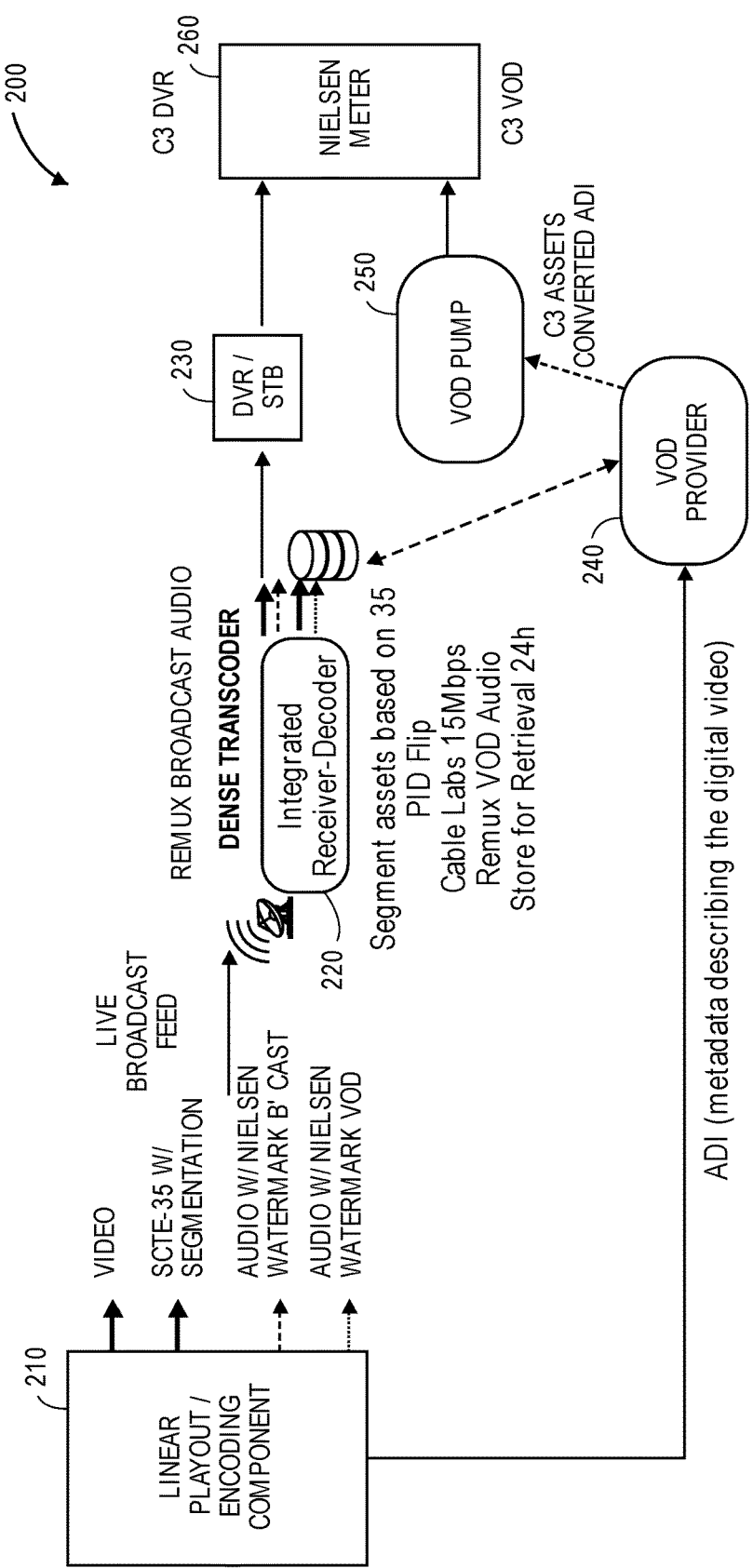
FIG. 2 is a block diagram of a system for creating and distributing a broadcast feed comprising a video on demand (VOD) watermark according to an embodiment of the invention.

The performance of step 110 may be performed at liner playout/encoding component 210 shown in FIG. 2.

In step 120, a video on demand (VOD) watermark is inserted or affixed to the duplicate version of the accompanying audio stream created in step 110. The VOD watermark may be a Nielsen VOD watermarking, although embodiments of the invention may use any type of digital watermark.

Note that contemporaneous with the performance of step 120, a broadcast watermark will be inserted or affixed into the original audio stream. Thus, each audio stream will have a different watermark, as the original audio stream will bear a broadcast watermark (which may be, but need not be, a Nielson broadcast watermark), and the duplicate version of the accompanying audio stream created in step 110 will bear the video on demand (VOD) or C3 watermark (which may be, but need not be, a Nielson broadcast watermark).

The performance of step 120 may be performed at liner playout/encoding component 210 in FIG. 2. For example, FIG. 2 depicts liner playout/encoding component 210 outputting a video stream as well as two separate audio streams, namely one audio stream bearing a broadcast watermark and another audio stream bearing a VOD watermark.

FIG. 2 also depicts liner playout/encoding component 210 outputting SCTE-35 standard metadata, which is used in synchronizing an audio stream to a video stream. FIG. 3 is a table illustrating SCTE-35 standard segmentation information according to an embodiment of the invention. SCTE-35 a joint ANSI/Society of Cable and Telecommunications Engineers standard. The SCTE-35 standard segmentation information shown in FIG. 3 allows the recording of an asset out of a broadcast feed, as the information identifies where the program starts, stop, and the like.

In step 130, linear layout/encoding component 210 may transmit the broadcast video feed to integrated receiver-decoder 220. The broadcast video feed comprises both the original accompanying audio stream (which includes a broadcast watermark) and the duplicate version of the accompanying audio stream (which includes a VOD watermark). The broadcast video feed also contains, in an embodiment, SCTE-35 standard segmentation information and other markers. Integrated receiver-decoder 220 may be embodied, in an embodiment, by one or more products in the ProView family of products from Harmonic, Inc. of San Jose Calif.

In step 140, integrated receiver-decoder 220 receives and processes the broadcast video feed. In step 140, integrated receiver-decoder 220 processes the received broadcast video feed and creates a version of the broadcast video feed to be broadcast (a "broadcast version") and a separate version of the broadcast video feed to be distributed by video on demand (VOD) (a "VOD version").

To create the broadcast version, integrated receiver-decoder 220 will remove the duplicate version of the original audio stream that comprises the VOD watermark without removing the original audio comprising the broadcast watermark. The broadcast version will continue to the MVPD through their regular broadcast chain and hit the consumer set top box (STB) or digital video recorder (DVR), which is identified as STB/DVR 230 in FIG. 2.

To create the VOD version, integrated receiver-decoder 220 will remove the original version of the audio stream that comprises the broadcast watermark without removing the duplicate version of the original audio stream that comprises the VOD watermark.

Markers, such as but not limited to time codes, may be used by integrated receiver-decoder 220 to record an asset (i.e., a unit of digital video, such as a movie, commercial, and the like) out of the broadcast feed and to align the recorded asset with the VOD watermarked audio to ensure proper local storage and playout. Such markers include the SCTE-35 segmentation descriptors depicted in FIG. 3. In order for the asset to be ready for VOD playout, the asset may need to be re-encoded at a CBR bitrate and have the PIDs structured in a pre-defined manner. For example, after recording the asset from the broadcast feed, a PID flip may need to be conducted according to CableLabs specification and metadata (ADI) may need to be added in order to create a package for VOD pump 250 to retrieve. After the asset (or unit of digital video) is synchronized with VOD audio, then the asset with the synchronized VOD audio (the VOD version) is provided to VOD provider 240.

In step 150, after receiving the VOD version of the broadcast video from integrated receiver-decoder 220, VOD provider 240 may make available the VOD digital video via standard video on demand distribution channels. For example, standard video on demand distribution channels may include the operation of one or more VOD servers from which the VOD version of the video may be obtained.

The metadata describing the assets (ADI) has to be married to the file before handing over to VOD pump 250. Each VOD pump 250 has a unique format and VOD providers 240 have the expertise and knowledge to make the necessary conversions. Based on an ID, a VOD provider 240 can marry the assets and ADI and create a package ready for VOD pump 250 to play. As this VOD asset is created from the broadcast video feed, VOD assets can be available for playback immediately after the actual broadcast airing.

When a consumer views either the broadcast feed or VOD asset, the Nielsen meter 260 will identify the different watermarks in the audio and classify the viewing as either live/DVR or C3/VOD. The broadcast watermark and the VOD watermark allows Nielsen meter 260 to distinguish between a broadcast viewing and a video on demand (VOD) viewing. Thus, use of the broadcast watermark and the VOD watermark in system 200 allows Nielsen meter 260 to monitor, accumulate, and tally the viewing of Broadcast and digital video recorder (DVR) viewings vs. C3.

Note that in an alternate embodiment other than that depicted in FIG. 1, rather than broadcasting the watermarked duplicate version of the audio stream in step 130, the watermarked audio may be sent asynchronously from linear playout/encoding component 210 to integrated receiver-decoder 220 using numerous transmission methodologies. In such an embodiment, it would not be necessary for the digital broadcast video feed sent from liner playout/encoding component 210 to integrated receiver-decoder 220 to contain the VOD watermark; however, integrated receiver-decoder 220 would still record the broadcast digital video. Once integrated receiver-decoder 220 receives the watermarked audio, integrated receiver-decoder 220 may align the broadcast digital video with the VOD watermarked audio and may make provide the VOD version of the digital video to VOD provider 240.

HARDWARE MECHANISMS

Figure 4:
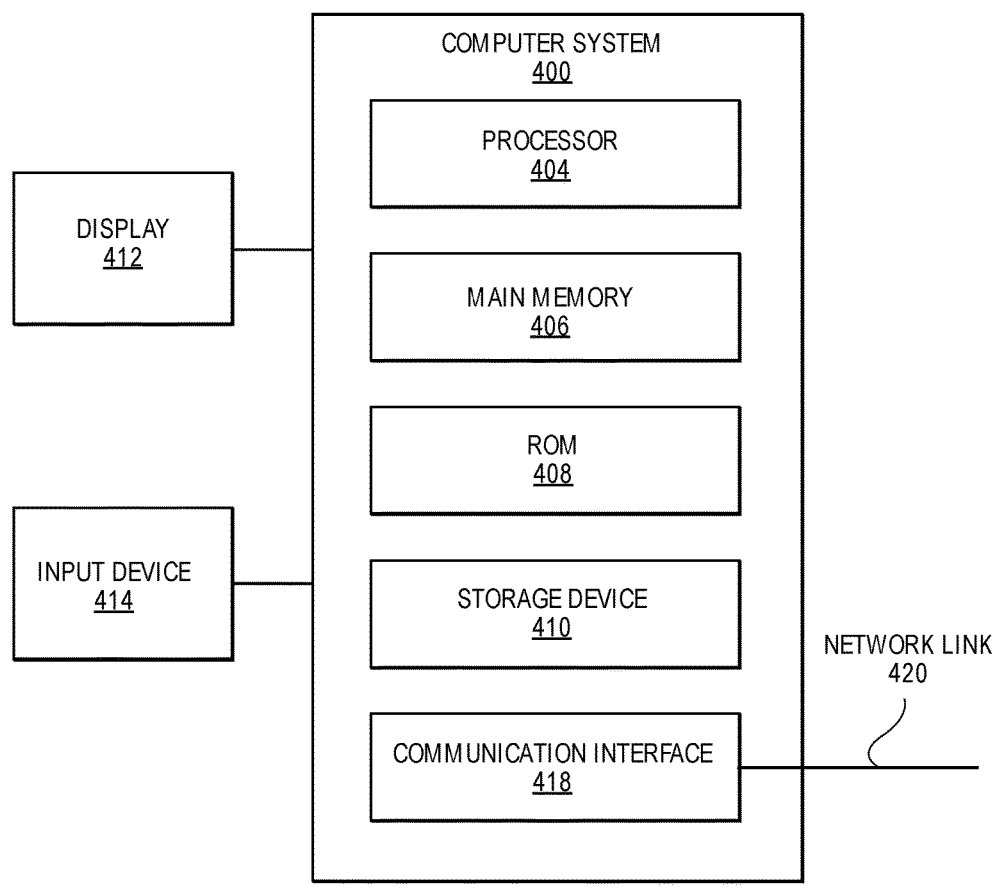
FIG. 4 is a block diagram that illustrates a computer system upon which a video on demand (VOD) watermark may be created and/or used according to an embodiment of the invention.

In an embodiment, the creation of a video on demand (VOD) watermark may be performed by software that executes on a computer system. FIG. 4 is a block diagram that illustrates a computer system 400 upon which an embodiment of the invention may be implemented. In an embodiment, computer system 400 includes processor 404, main memory 406, ROM 408, storage device 410, and communication interface 418. Computer system 400 includes at least one processor 404 for processing information. Computer system 400 also includes a main memory 406, such as a random access memory (RAM) or other dynamic storage device, for storing information and instructions to be executed by processor 404. Main memory 406 also may be used for storing temporary variables or other intermediate information during execution of instructions to be executed by processor 404. Computer system 400 further includes a read only memory (ROM) 408 or other static storage device for storing static information and instructions for processor 404. A storage device 410, such as a magnetic disk or optical disk, is provided for storing information and instructions.

Computer system 400 may be coupled to a display 412, such as a cathode ray tube (CRT), a LCD monitor, and a television set, for displaying information to a user. An input device 414, including alphanumeric and other keys, is coupled to computer system 400 for communicating information and command selections to processor 404. Other non-limiting, illustrative examples of input device 414 include a mouse, a trackball, or cursor direction keys for communicating direction information and command selections to processor 404 and for controlling cursor movement on display 412. While only one input device 414 is depicted in FIG. 4, embodiments of the invention may include any number of input devices 414 coupled to computer system 400.

Embodiments of the invention are related to the use of computer system 400 for implementing the techniques described herein. According to one embodiment of the invention, those techniques are performed by computer system 400 in response to processor 404 executing one or more sequences of one or more instructions contained in main memory 406. Such instructions may be read into main memory 406 from another machine-readable medium, such as storage device 410. Execution of the sequences of instructions contained in main memory 406 causes processor 404 to perform the process steps described herein. In alternative embodiments, hard-wired circuitry may be used in place of or in combination with software instructions to implement embodiments of the invention. Thus, embodiments of the invention are not limited to any specific combination of hardware circuitry and software.

The term "non-transitory machine-readable storage medium" as used herein refers to any tangible medium that participates in storing instructions which may be provided to processor 404 for execution. Such a medium may take many forms, including but not limited to, non-volatile media and volatile media. Non-volatile media includes, for example, optical or magnetic disks, such as storage device 410. Volatile media includes dynamic memory, such as main memory 406. The term "non-transitory machine-readable storage medium" does not include any transitory medium, such as a signal.

Non-limiting, illustrative examples of machine-readable media include, for example, a floppy disk, a flexible disk, hard disk, magnetic tape, or any other magnetic medium, a CD-ROM, any other optical medium, a RAM, a PROM, and EPROM, a FLASH-EPROM, any other memory chip or cartridge, or any other medium from which a computer can read.

Various forms of machine readable media may be involved in carrying one or more sequences of one or more instructions to processor 404 for execution. For example, the instructions may initially be carried on a magnetic disk of a remote computer. The remote computer can load the instructions into its dynamic memory and send the instructions over a network link 420 to computer system 400.

Communication interface 418 provides a two-way data communication coupling to a network link 420 that is connected to a local network. For example, communication interface 418 may be an integrated services digital network (ISDN) card or a modem to provide a data communication connection to a corresponding type of telephone line. As another example, communication interface 418 may be a local area network (LAN) card to provide a data communication connection to a compatible LAN. Wireless links may also be implemented. In any such implementation, communication interface 418 sends and receives electrical, electromagnetic or optical signals that carry digital data streams representing various types of information.

Network link 420 typically provides data communication through one or more networks to other data devices. For example, network link 420 may provide a connection through a local network to a host computer or to data equipment operated by an Internet Service Provider (ISP).

Computer system 400 can send messages and receive data, including program code, through the network(s), network link 420 and communication interface 418. For example, a server might transmit a requested code for an application program through the Internet, a local ISP, a local network, subsequently to communication interface 418. The received code may be executed by processor 404 as it is received, and/or stored in storage device 410, or other non-volatile storage for later execution.

In the foregoing specification, embodiments of the invention have been described with reference to numerous specific details that may vary from implementation to implementation. Thus, the sole and exclusive indicator of what is the invention, and is intended by the applicants to be the invention, is the set of claims that issue from this application, in the specific form in which such claims issue, including any subsequent correction. Any definitions expressly set forth herein for terms contained in such claims shall govern the meaning of such terms as used in the claims. Hence, no limitation, element, property, feature, advantage or attribute that is not expressly recited in a claim should limit the scope of such claim in any way. The specification and drawings are, accordingly, to be regarded in an illustrative rather than a restrictive sense.

What is claimed is:

1. One or more non-transitory computer-readable storage mediums storing one or more sequences of instructions for creating a video on demand (VOD) watermark, which when executed by one or more processors, cause:

creating, for a digital broadcast stream, a duplicate version of an accompanying audio stream comprised within said digital broadcast stream, inserting within said duplicate version of said accompanying audio stream said video on demand (VOD) watermark;

transmitting, to an integrated receiver-decoder, said digital broadcast stream transmitting, to said integrated receiver-decoder, said duplicate version of said accompanying audio stream, wherein said duplicate version comprises a VOD watermark, and wherein said duplicate version of said accompanying audio stream is transmitted to said integrated receiver-decoder in a separate transmission than said digital broadcast stream; and at said integrated receiver-decoder, (a) creating a broadcast version of said digital broadcast stream which comprises a broadcast watermark using said digital broadcast stream and (b) creating a video on demand (VOD) version of said digital broadcast stream by synchronizing said duplicate version of said accompanying audio stream, comprising said VOD watermark, with video content in said digital broadcast stream.

2. The one or more non-transitory computer-readable storage mediums of claim 1, wherein said creating said video on demand (VOD) version of said digital broadcast stream is performed in real time or near real time to broadcasting said broadcast version of said digital broadcast stream.

3. The one or more non-transitory computer-readable storage mediums of claim 1, wherein said duplicate version of said accompanying audio stream does not comprise said broadcast watermark.

4. The one or more non-transitory computer-readable storage mediums of claim 1, wherein said VOD watermark is a Neilson VOD watermark.

5. The one or more non-transitory computer-readable storage mediums of claim 1, wherein execution of the one or more sequences of instructions further cause:
the integrated receiver-decoder aligning the duplicate version of said accompanying audio stream with said digital broadcast stream.

6. An apparatus for creating a video on demand (VOD) watermark, comprising:
one or more processors; and
one or more non-transitory computer-readable storage mediums storing one or more sequences of instructions, which when executed, cause:
creating, for a digital broadcast stream, a duplicate version of an accompanying audio stream comprised within said digital broadcast stream,
inserting within said duplicate version of said accompanying audio stream said video on demand (VOD) watermark;
transmitting, to an integrated receiver-decoder, said digital broadcast stream;
transmitting, to said integrated receiver-decoder, said duplicate version of said accompanying audio stream, wherein said duplicate version comprises a VOD watermark, and wherein said duplicate version of said accompanying audio stream is transmitted to said integrated receiver-decoder in a separate transmission than said digital broadcast stream; and
at said integrated receiver-decoder, (a) creating a broadcast version of said digital broadcast stream which comprises a broadcast watermark using said digital broadcast stream and (b) creating a video on demand (VOD) version of said digital broadcast stream by synchronizing said duplicate version of said accompanying audio stream, comprising said VOD watermark, with video content in said digital broadcast stream.

7. The apparatus of claim 6, wherein said creating said video on demand (VOD) version of said digital broadcast stream is performed in real time or near real time to broadcasting said broadcast version of said digital broadcast stream.

8. The apparatus of claim 6, wherein said duplicate version of said accompanying audio stream does not comprise said broadcast watermark.

9. The apparatus of claim 6, wherein said VOD watermark is a Neilson VOD watermark.

10. The apparatus of claim 6, wherein execution of the one or more sequences of instructions further cause:
the integrated receiver-decoder aligning the duplicate version of said accompanying audio stream with said digital broadcast stream.

11. A method for creating a video on demand (VOD) watermark, comprising:
creating, for a digital broadcast stream, a duplicate version of an accompanying audio stream comprised within said digital broadcast stream,
inserting within said duplicate version of said accompanying audio stream said video on demand (VOD) watermark;
transmitting, to an integrated receiver-decoder, said digital broadcast stream;
transmitting, to said integrated receiver-decoder, said duplicate version of said accompanying audio stream, wherein said duplicate version comprises a VOD watermark, and wherein said duplicate version of said accompanying audio stream is transmitted to said integrated receiver-decoder in a separate transmission than said digital broadcast stream; and
at said integrated receiver-decoder, (a) creating a broadcast version of said digital broadcast stream which comprises a broadcast watermark using said digital broadcast stream and (b) creating a video on demand (VOD) version of said digital broadcast stream by synchronizing said duplicate version of said accompanying audio stream, comprising said VOD watermark, with video content in said digital broadcast stream.

12. The method of claim 11, wherein said creating said video on demand (VOD) version of said digital broadcast stream is performed in real time or near real time to broadcasting said broadcast version of said digital broadcast stream.

13. The method of claim 11, wherein said duplicate version of said accompanying audio stream does not comprise said broadcast watermark.

14. The method of claim 11, wherein said VOD watermark is a Neilson VOD watermark.

15. The method of claim 11, further comprising:
the integrated receiver-decoder aligning the duplicate version of said accompanying audio stream with said digital broadcast stream.

* * * * *